United States Patent [19]

Smith

[11] Patent Number: 4,463,241
[45] Date of Patent: Jul. 31, 1984

[54] FIXTURE FOR ELECTRODE WIRE EDM APPARATUS

[75] Inventor: Gary W. Smith, New Albany, Ohio

[73] Assignee: General Electric Company, Worthington, Ohio

[21] Appl. No.: 393,225

[22] Filed: Jun. 28, 1982

[51] Int. Cl.³ .............................................. B23P 1/08
[52] U.S. Cl. ................................. 219/69 W; 219/69 R; 219/69 M; 269/303; 269/37
[58] Field of Search ............... 219/69 R, 68, 69 M, 219/69 W, 69 G, 158–161; 269/9, 10, 37, 40, 43, 91, 93, 303

[56] References Cited

U.S. PATENT DOCUMENTS

| | | | |
|---|---|---|---|
| 2,991,669 | 7/1961 | Stock | 269/93 |
| 3,121,280 | 2/1964 | McFadden | 269/40 |
| 3,224,753 | 12/1965 | Hefner | 269/91 |
| 3,239,321 | 3/1966 | Blainey et al. | 51/309 |
| 3,745,623 | 7/1973 | Wentorf, Jr. et al. | 29/95 B |
| 4,103,137 | 7/1978 | Levitt et al. | 219/69 W |
| 4,239,952 | 12/1980 | Rhyner | 219/69 W |
| 4,243,864 | 1/1981 | Vieau et al. | 219/69 W |
| 4,291,218 | 9/1981 | Myhre | 269/37 |

FOREIGN PATENT DOCUMENTS

| | | | |
|---|---|---|---|
| 56-76332 | 6/1981 | Japan | 219/69 M |
| 1333140 | 11/1973 | United Kingdom | 219/69 R |
| 0707746 | 1/1980 | U.S.S.R. | 219/69 W |

Primary Examiner—M. H. Paschall
Attorney, Agent, or Firm—Robert R. Schroeder; Douglas B. Little

[57] ABSTRACT

Disclosed is an improved fixture assembly for use on an electrode wire EDM apparatus which is adapted to cut a conductive workpiece. Referring to FIG. 2, the improved fixture which can secure a plurality of workpieces 52 comprises master bar 40, which is secured to work supports 30 transversely therebetween, base plate 42 which is removably attached to the master bar at a predetermined location thereof and which has a plurality of equally-spaced support locations upon which each said workpiece rests, locator plate 44 which is removably attached to the base plate at a predetermined location thereof and which has a plurality of equally-spaced recesses of predetermined shape along an edge thereof for a side of each workpiece to be held thereagainst, and a plurality of pre-configured clamps 48 removably attached to the upper side of said locator plate which are tightenable to exert force against the top surface of each workpiece for securing the workpiece in a precise location for cutting. The edgewise profiles of all components of said fixture are adapted so that each workpiece is secured and all components are non-interfering with the predetermined cutting path. The preferred workpieces comprise polycrystalline abrasive compacts typified by polycrystalline diamond compacts preferably supported on a metal support.

8 Claims, 37 Drawing Figures

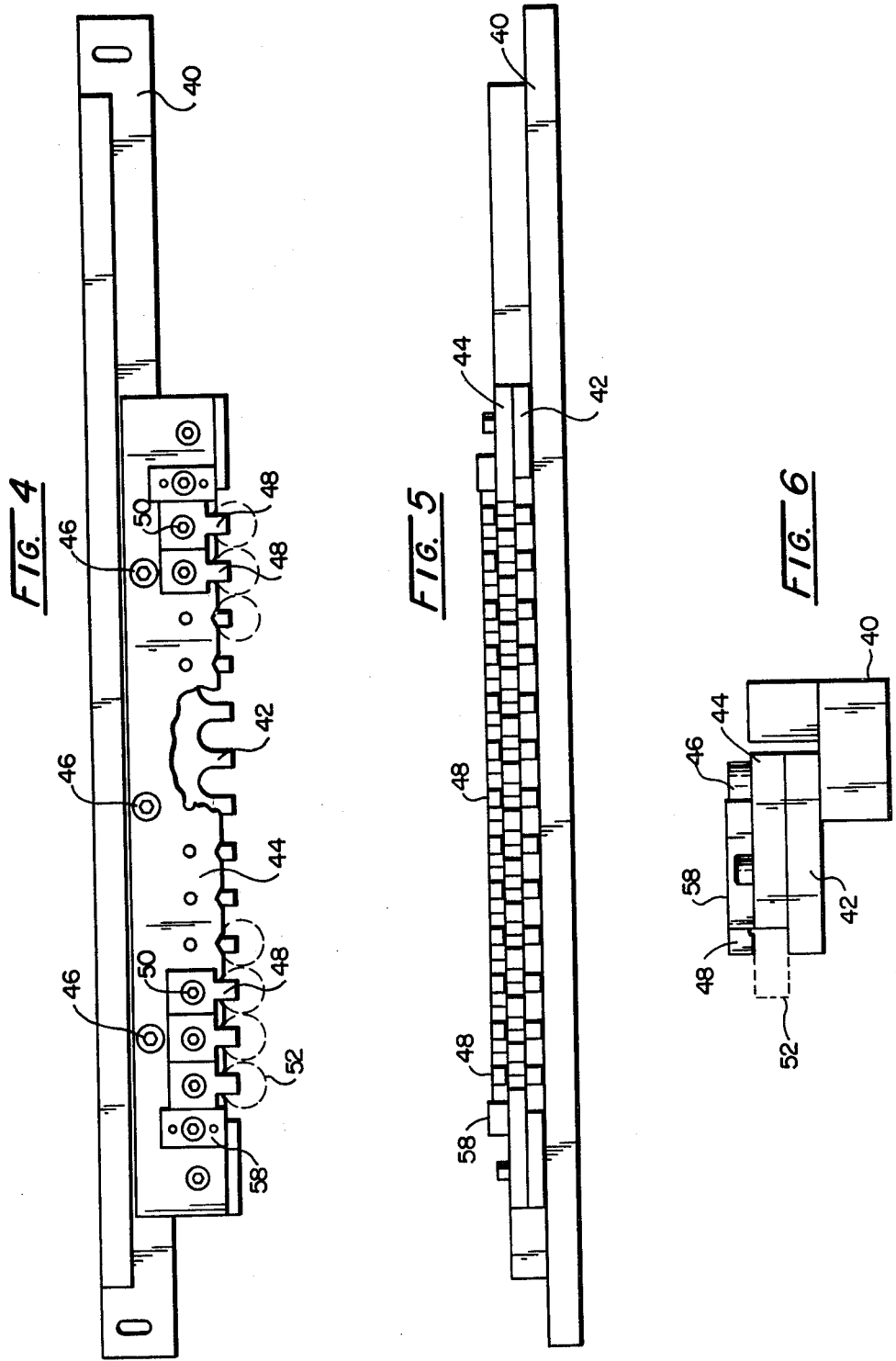

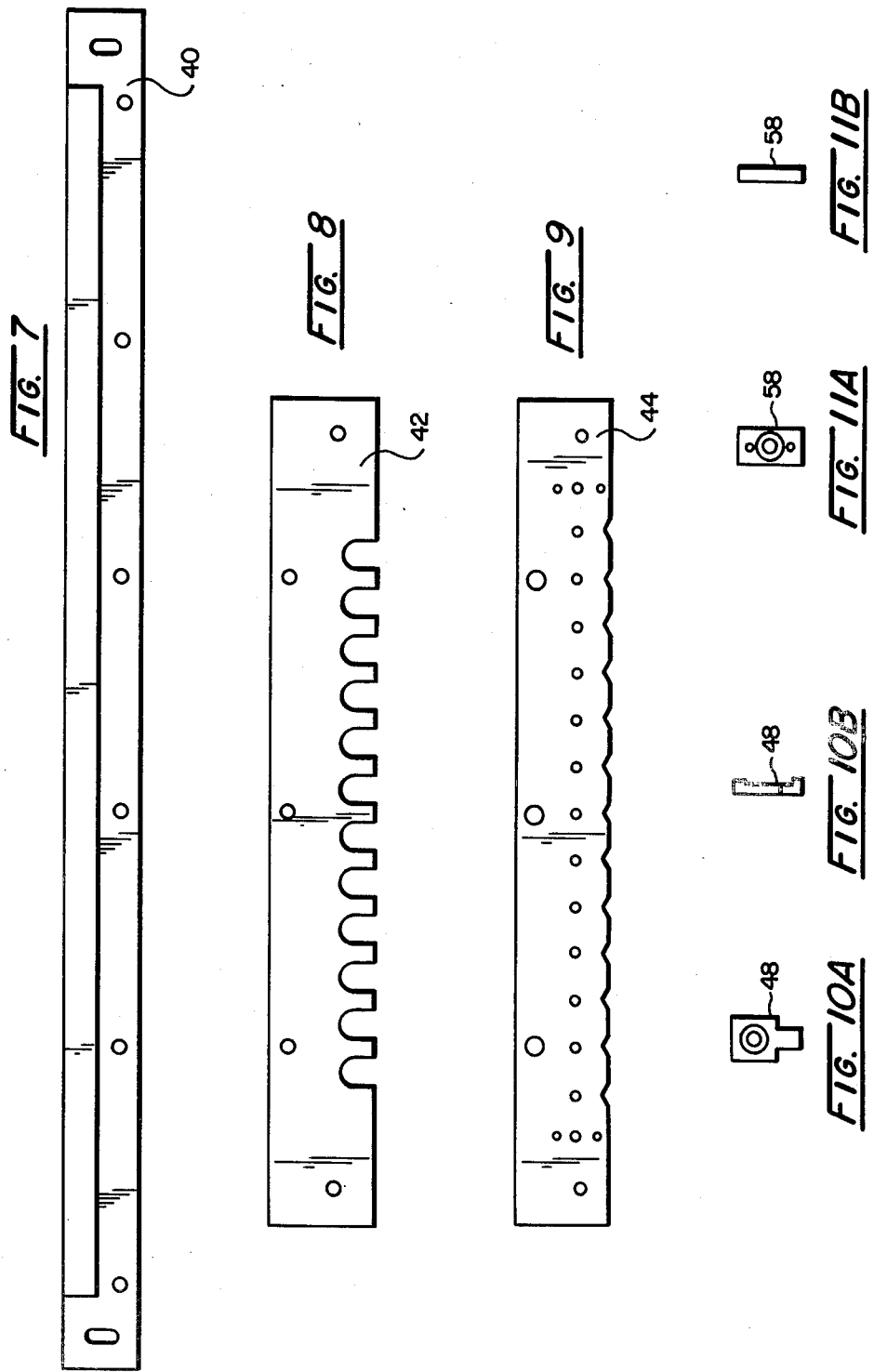

FIXTURE FOR ELECTRODE WIRE EDM APPARATUS

BACKGROUND OF THE INVENTION

The present invention relates to an electrode wire EDM apparatus and more particularly to an improved fixture for such apparatus.

Electrical discharge machining (EDM) is a method for removing material from electrically conductive substrates through a process of melting or vaporization by high-frequency electrical sparks. An advantageous electrode for effecting a cutting action by EDM technology is an electrode wire which is charged as an anode or cathode with the workpiece bearing an opposite charge. In this regard, see METALS HANDBOOK, Vol. 3, 8th Ed., p. 227, American Society for Metals (1967), the disclosure of which is expressly incorporated herein by reference. Besides machining metal substrates for making, for example, dyes, an electrode wire EDM apparatus can cut virtually any electrically conductive workpiece including workpieces containing diamond, as shown in the following publications: "Machining of Diamond by High Energy-Density Sources", ADVANCED WELDING TECHNOLOGY, the Second International Symposium of the Japan Welding Society, Paper No. 2-6-(5), 25-27 August 1975; British Patent No. 1,338,140; and U.S. Pat. No. 3,239,321, the disclosures of which are expressly incorporated herein by reference.

Typical machine designs of an electrode wire EDM apparatus can be found in U.S. Pat. Nos. 4,103,137 and 4,239,952, the disclosures of which are expressly incorporated herein by reference. The workpiece to be cut by the electrode wire EDM apparatus is held fixed in position relative to the electrode wire by a fixture. The fixture is in the cutting or working zone which is traversed by the cutting electrode wire.

A compact is a polycrystalline mass of abrasive particles (e.g. diamond or cubic boron nitride) bonded together to form an integral, tough, coherent, high strength mass. A composite compact is a compact bonded to a substrate material such as cemented tungsten carbide. Representative U.S. Patents on compacts are: 3,141,746; 3,745,623 and 3,743,489. Compacts may be used as blanks for cutting tools, dressing tools and wear parts. In cutting polycrystalline diamond compacts and polycrystalline diamond composite compacts, it is commonly recommended that each compact be glued to the fixture for machining. Obviously, such procedure is cumbersome, time consuming, and labor intensive. Further, such crude procedure does not permit the cutting of multiple compacts with consistency for maintaining extremely fine tolerances (eg. 0.05 mm). The need for developing a fixture which can service a multitude of individual compacts in a single operation while maintaining consistency in defined tolerances repeatedly is needed in this art. The present invention addresses this problem and provides a unique, improved fixture.

BROAD STATEMENT OF THE INVENTION

The present invention is an improved electrode wire EDM apparatus adapted to cut an electrode workpiece in a cutting zone wherein the electrode wire and workpiece are in spaced-apart relationship according to a predetermined cutting path which is traversed by the cutting wire. The workpiece is removably mounted to a fixture which is removably secured to parallel spaced-apart work supports. The space between the work supports and adjacent the fixture defines the cutting zone. The improved fixture for said EDM apparatus according to the present invention can secure a plurality of said workpieces. Such improved fixture comprises:

(a) a master bar which is secured to said work supports transversely therebetween and within said cutting zone;

(b) a base plate which is removably attached to the upper side of said master bar at a predetermined location thereof, said base plate having a plurality of equally-spaced support locations upon which said plurality of workpieces rest;

(c) a locator plate which is removably attached to the upper side of said base plate at a predetermined location thereof, said locator plate having a plurality of equally-spaced recesses of predetermined size along an edge thereof and above said base plate support locations for a side of each of said workpieces to be held thereagainst; and (d) a plurality of pre-configured clamps removably attached to the upper side of said locator plate and which are tightenable to exert force against the top surface of each workpiece for securing each workpiece in a precise location for cutting. The edgewise profile of all components of said fixture is adapted so that each workpiece is secured and non-interfering with said predetermined cutting path.

Desirably, the plurality of workpieces comprise compacts of polycrystalline abrasive crystals affixed to a metal carbide substrate. Preferably, the edgewise profile of the base plate and the locator plate is cut by the EDM apparatus when each said plate is in an operating position attached to said master bar.

Advantages of the present invention include a fixture which is self-aligning and in which any individual compact within the plurality of compacts can be serviced while the electrode wire EDM apparatus is in operation. Another distinct advantage is that multiple compacts can be consistently cut while maintaining very close tolerances for each compact. A further advantage is that only a matter of minutes is required for an operator to remove cut workpieces and insert a plurality of new workpieces for cutting. These and other advantages readily will be apparent to those skilled in the art based upon the disclosure contained herein.

BRIEF DESCRIPTION OF THE DRAWINGS

FIG. 4 is a top view of the fixture with a portion of the locator plate cut away to expose the details of the base plate;

FIG. 5 is a front elevational view of the fixture shown in FIG. 4;

FIG. 6 is a side elevational view of the fixture shown in FIGS. 4 and 5;

FIG. 7 is a top view of the master bar of the fixture shown in FIG. 4;

FIG. 8 is a top view of the base plate of the fixture shown in FIG. 4;

FIG. 9 is a top view of the locator plate shown in FIG. 4;

FIGS. 10A and 10B are a top and side view, respectively, of the clamp shown in FIG. 4;

FIGS. 11A and 11B show a top view and side view, respectively, of an alternative clamp design;

FIGS. 23A and 23B through 27A and 27B, inclusive, show top views and side views, respectively, of different embodiments of the clamp;

The drawings will be described in greater detail in connection with the detailed description of the invention which follows.

DETAILED DESCRIPTION OF THE INVENTION

For a clear understanding of the invention, a particular commercial electrode wire EDM apparatus has been chosen to illustrate and describe the invention. This description and reference to the electrode wire EDM apparatus is not limitative of the present invention.

Figure 1:
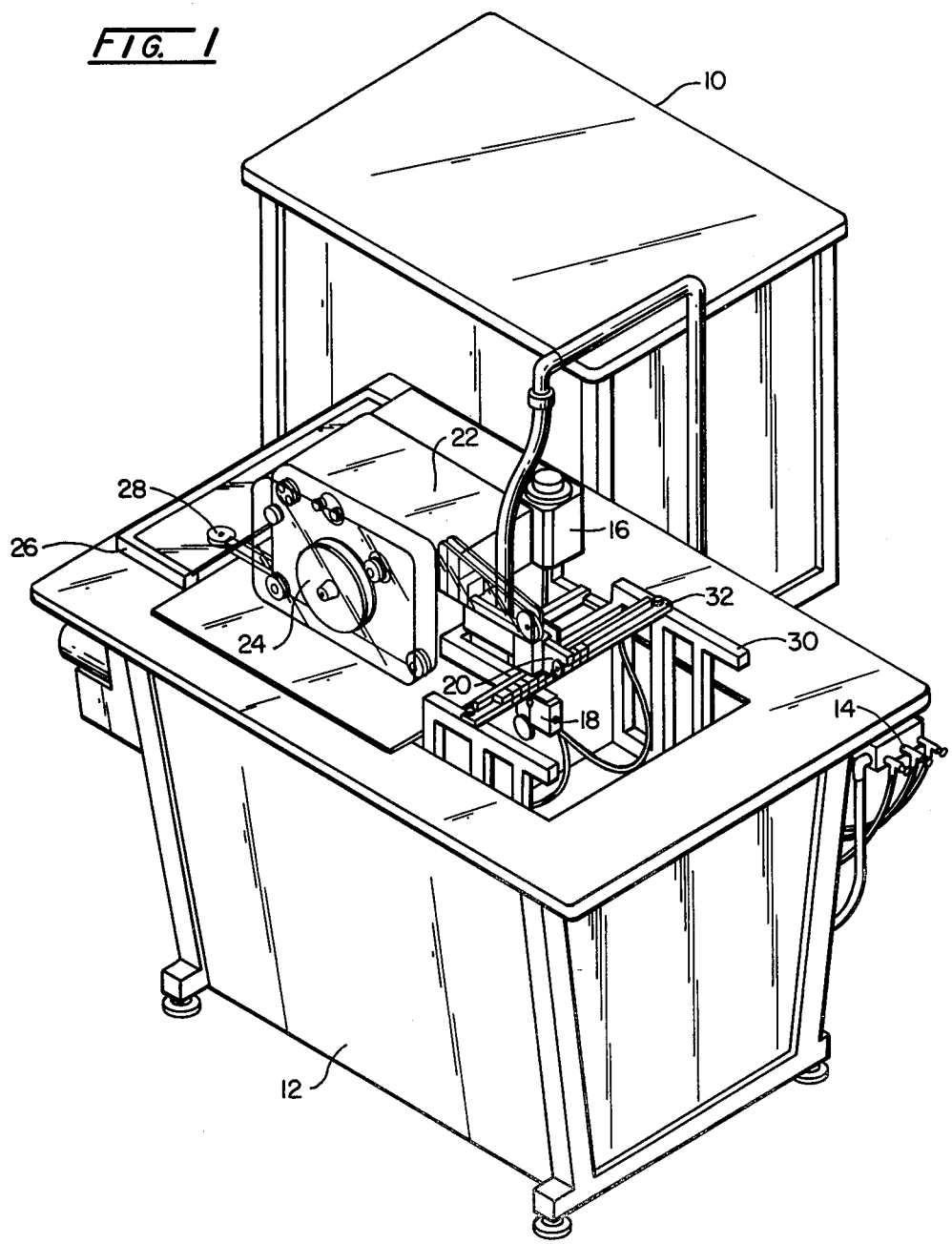
FIG. 1 shows a perspective view of a representative electrode wire EDM apparatus comprising a controller and a slave machine.

The electrode wire EDM apparatus shown in FIG. 1 is a Charmilles/Andrew Model EF-330 (manufactured by Andrew Engineering Company, Minnetonka, Minn.). Further details on the Model EF-330 can be found in U.S. Pat. Nos. 3,614,372; 3,849,624; 3,943,322; 3,912,899; 3,956,609; and 4,081,652; and U.S. patent applications Ser. Nos. 843,431, filed Oct. 19, 1977; 884,235, filed Mar. 7, 1978; 14,927, filed Feb. 26, 1979; 26,446, filed Apr. 2, 1979; 26,447, filed Apr. 2, 1979; 46,073, filed Apr. 21, 1979; and 46,079, filed May 21, 1979. The Model EF-330 consists of controller 10 and slave machine 12. The controller has a tape reader and/or keyboard for information to be entered into its computer. The computer analyzes the input and responds by issuing a command series to slave machine 12 for performing the electrode machining operation. Slave machine 12 contains the electrode wire, the fixture, a flushing system, and appropriate (servo) controls for effecting the cutting action in the c, y, and z axis directions. A flow of water constantly is flushed through the cutting zone and intersects the workpiece being cut and is controlled by flushing controls 14. Water intersects the workpiece from lower flushing head assembly 18 and upper flushing head assembly 20. The electrode wire direction is controlled by C-axis assembly 16, X-axis assembly 22 and Y-axis assembly (not shown). Wire transport system 24 transports the cutting wire through upper flushing head assembly 20 and lower flushing head assembly 18 via a series of pulleys and spools. The used wire is taken up on a pulley (not shown). The plotter assembly consists of plotting table 26 and plotting arm 28 which permits the slave to execute a given program without actually cutting so that the operator can make a drawing of the cutting program. The accuracy of the program then can be readily checked against the generated drawing. Parallel work supports 30 bear fixture assembly 32. Adjacent fixture 32 and between parallel work supports is the working area or cutting zone through which the electrode wire intersects the workpieces for cutting.

Figure 2:
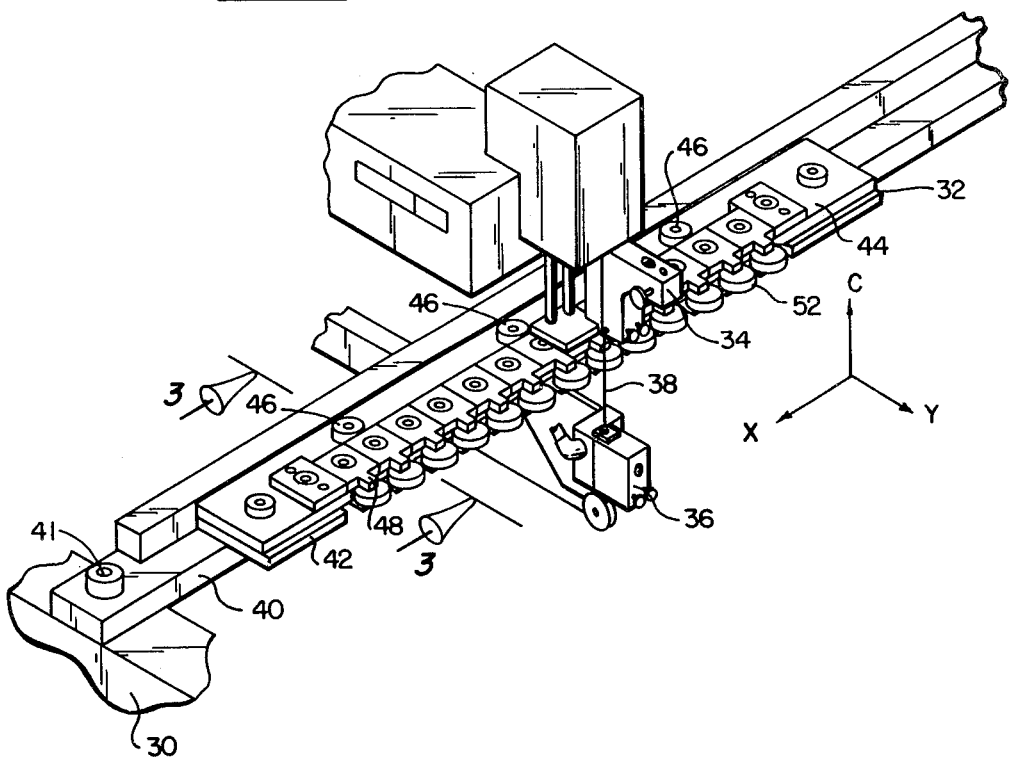
FIG. 2 shows an enlarged perspective view of the fixture of the present invention in its operating position within the cutting zone of the EDM apparatus.
Figure 3:
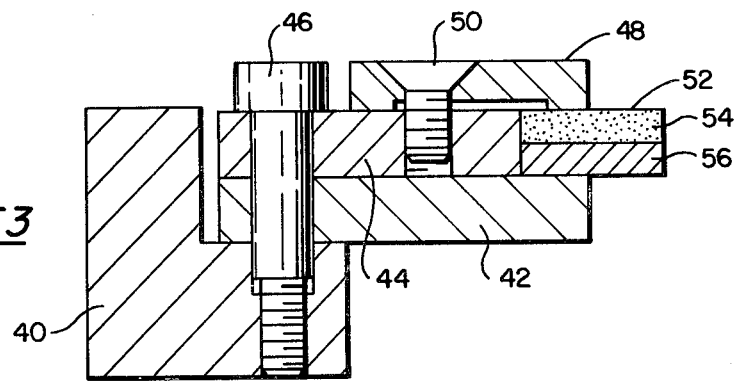
FIG. 3 is a sectional view of the fixture and workpiece taken along line 3—3 of FIG. 2.
Figure 12:
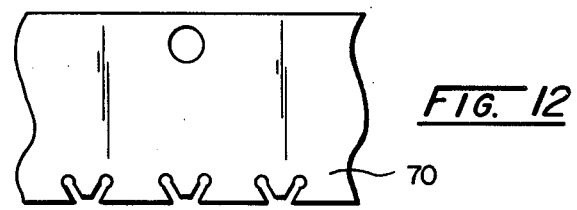
FIGS. 12-16, inclusive, show top views of the edgewise profile of alternative designs of the base plate.
Figure 13:
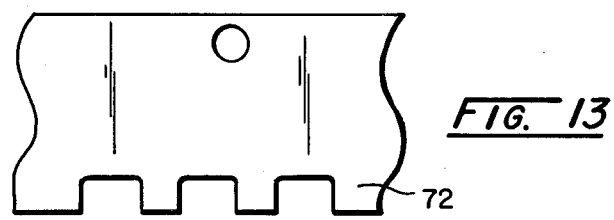
Figure 14:
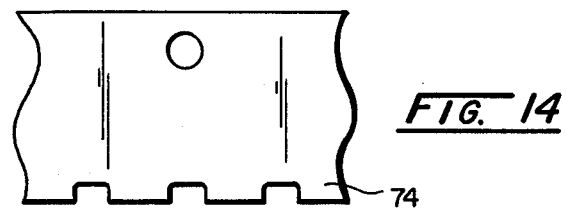
Figure 15:
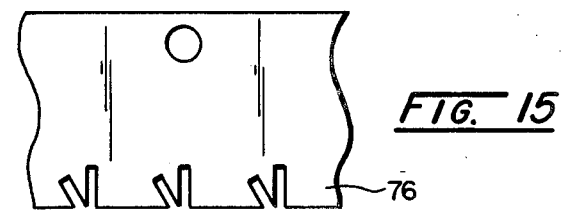
Figure 16:
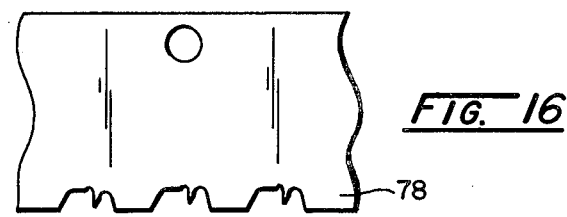
Figure 17:
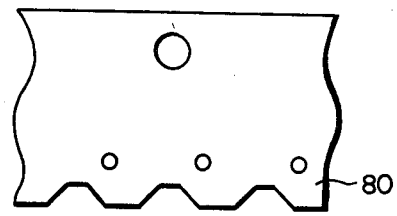
FIGS. 17-22, inclusive, show top views of different embodiments of the edgewise profile of the locator plate.
Figure 18:
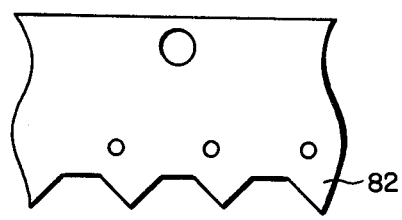
Figure 19:
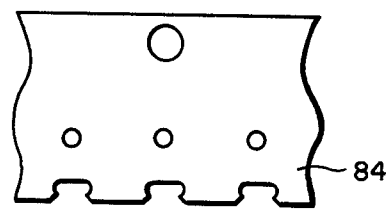
Figure 20:
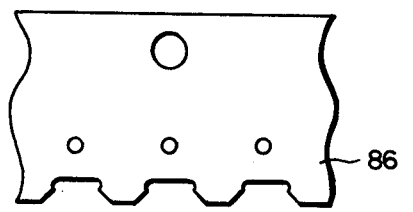
Figure 21:
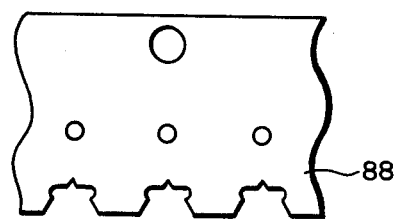
Figure 22:
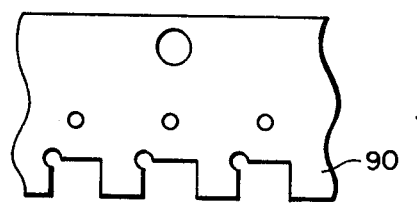
Figure 23A:
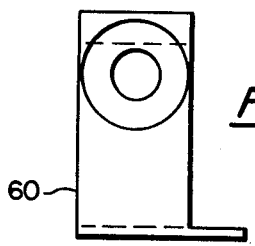
Figure 23B:
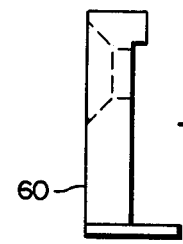
Figure 24A:
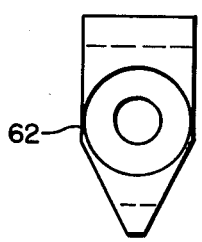
Figure 24B:
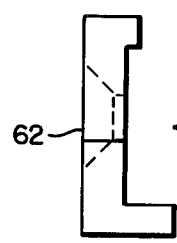
Figure 25A:
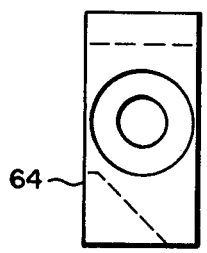
Figure 25B:
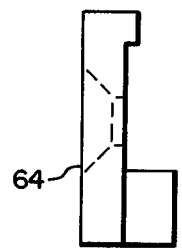
Figure 26A:
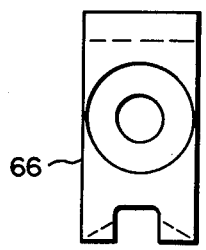
Figure 26B:
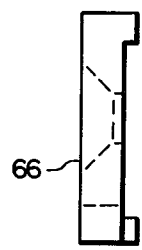
Figure 27A:
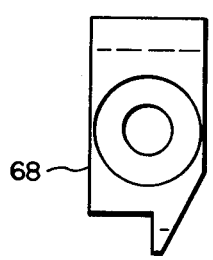
Figure 27B:
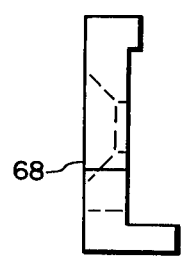

Referring to FIG. 2, cutting wire 38 is borne through upper flushing head 34 of assembly 20 and lower flushing head 36 of assembly 18. Fixture assembly 32 comprises master bar 40 which is precisely attached to parallel work supports 30 by bolt 41 and a similar bolt on the other parallel work support (not shown). Master bar 40 bears base plate 42, locator plate 44, clamp 48 and workpieces 52. Each workpiece 52 is shown in FIG. 2 and FIG. 3 to be secured in position by base plate 42 and clamp 48 with the horizontal location of workpiece 52 being determined by its being pushed up against locator plate 44. Each base plate 42 and locator plate 44 is precision machined so that the position thereof is precisely known when bolts 46 secure base plate 42 and locator plate 44 to master bar 40. Cutting wire 38 and the entire assembly bearing cutting wire 38 moves while fixture assembly 32 and parallel work supports 30 remain stationary. Cutting wire 38 follows a predetermined programmed path dictated by controller 10 for cutting workpieces 52. Allen bolts 50 secure clamps 48 to locator plate 44 and can be tightened and loosened quickly with an Allen wrench. The preferred workpiece 52 is shown in FIG. 3 to be a composite compact 52 consisting of a polycrystalline diamond mass 54 secured to substrate 56 which desirably is tungsten carbide. It will be appreciated that the preferred polycrystalline abrasive is diamond though cubic boron nitride or other hard abrasive crystals can be formed into compacts for cutting according to the present invention.

FIGS. 4, 5, and 6 show a representative particular base plate, locator plate, and clamp which form a novel fixture according to the present invention. It will be appreciated that depending upon the ultimate size and shape of the workpiece products, the edge of base plate 42 and locator plate 44 (as well as the design of clamp 48) will have an edgewise profile suitable for retaining each workpiece without interfering in the cutting path of electrode wire 38 and permitting the maximum number of parts to be cut from each workpiece. Referring to FIG. 4, base plate 42 in the cut-away section is shown to have a rectangular tongue for supporting the base of each workpiece. A triangular indentation or recess in locator plate 44 determines the horizontal position of each workpiece and clamp 48 secured by Allen bolts 50 applies pressure to the top of each workpiece to securely retain the workpiece during cutting. For example, the particular design shown in FIGS. 4-6 are intended for cutting products from each workpiece in the shape of triangular wedges having a 45° or 60° angle.

FIGS. 7-10 show each component of the fixture assembly shown in FIGS. 4-6. Master bar 40 is a standardized design which is adapted to have a variety of locator and base plates attached thereto. Depending upon the size and shape of the product to be cut from the workpieces, different combinations of base plates, locator plates, and clamps are used. Each base plate 42 and locator plate 44 have precisely machined holes for being secured in a precise location to master bar 40. Preferably, the edgewise profile of base plate 42 and locator plate 44 is cut by the electrode wire EDM apparatus shown in FIG. 1. Each combination of base plate 42 and locator plate 44 can be disassembled and reassembled quickly to master bar 40. The operator can insert the workpiece and secure it firmly to the fixture assembly by clamp 48 rather quickly and place each workpiece in a predetermined precise location for achieving consistency of product uniformity. It should be noted that when each different combination of base plate 42 and locator plate 44 are affixed to master bar 40, alignment of such assembly is accomplished by placing a compact in one of the end positions. The electrode wire then is placed adjacent such compact at a predetermined distance therefrom and a trial cut to the center of the compact made. Once the precise location of the center of the workpiece has been established, the precise location of each compact is known since the edgewise profile recesses of each base plate 42 and locator plate 44 are equally spaced apart from center to center (center being the center of the compact when in position). Thus, each new fixture assembly readily can be calibrated by merely calibrating an end position. The remaining workpiece positions, then, are precisely defined.

For effecting different shapes of products to be made from each workpiece, a variety of combinations of base plate 42, locator plate 44, and clamp 48 are required. FIGS. 11 and 22–26 show additional embodiments of clamps which find utility in the fixture assembly of the present invention. Additional designs of base plate 42 are shown in FIGS. 12–16 and different designs of locator plate 44 are shown in FIGS. 17–21. As an example, 45° and 60° arc wedge shape products can be cut by using a combination of clamp 60 or 68, locator plate 80 or 88, and base plate 76. A 90° arc wedge shape product can be made using a combination of clamp 60, locator plate 44, and base plate 76. Rectangles can be cut from a circular workpiece by using a combination of clamp 48 or 66, locator plate 84 and base plate 74 or 78, for example. A multiplicity of combinations of clamps, base plates, and locator plates shown in the drawings can be conceived and will have utility according to the precepts of the present invention. Additionally, a variety of additional designs of these components can be made depending upon the initial shape of each workpiece and the desired shape of the product to be cut therefrom. Those embodiments shown in the drawings are illustrative of the flexibility and uniqueness which the present invention affords. As noted above, preferred workpieces are circular compacts such as diamond and cubic boron nitride abrasive compacts, desirably supported by tungsten carbide or other support material. Representative compacts can be found in U.S. Pat. Nos. 3,745,623; 3,609,818; 3,850,591; 3,743,489; 3,767,371; and 4,231,980. The disclosures of said references are expressly incorporated herein by reference. Product designs can vary from rectangular to wedge-shaped pieces cut from a workpiece disk to almost any design which finds use in industry. A unique feature of the fixture assembly of the present invention is that a particular product design can be replicated innumerable times with great accuracy (eg. tolerances of 0.05 mm and less are quite possible). Further, a multiplicity of compacts can be cut by the fixture design. Moreover, the operator can remove each cut workpiece and replace with a new workpiece for cutting in very little time. Thus, one operator can effectively operate several EDM machines having the unique fixture of the present invention.

Figure 28:
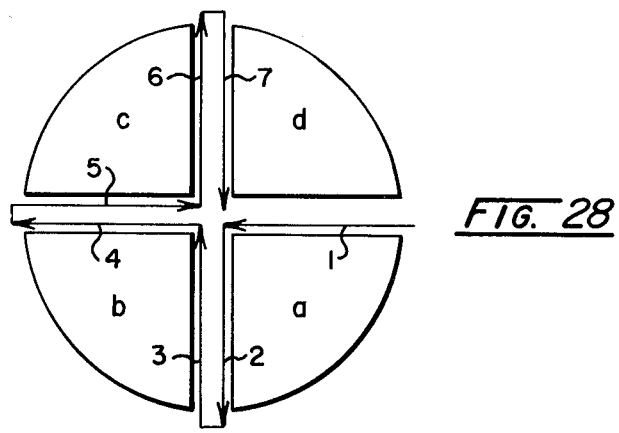
FIG. 28 shows the cutting path that the electrode wire traverses in cutting disk-shaped workpieces to produce four equal 90° arc wedge segments.

In order to further illustrate typical cutting paths that the electrode wire traverses when cutting wedge shape products as noted above, reference to FIGS. 28–30 is made. The cutting paths that the electrode wire traverses is shown in each of these figures. Referring to FIG. 28, this drawing shows the cutting path that the electrode wire traverses in cutting four equal 90° arc wedge shape products from a disk workpiece, such as composite compact 52. The clamp, locator plate, and base plate are not shown. Electrode wire 38 sequentially follows the numbered path segments to produce wedge shape products a, b, c, and d. The clamp, for example, holds the workpiece on segment d. The electrode wire is electrically energized through segment 1 from the outer edge of the workpiece to the center. Electrode wire 38 then follows segment 2 from the center to the edge of the workpiece resulting in 90° product a being cut away from the main workpiece. For ease of illustrating the cutting path, a slight sideways traverse is shown in the drawing. Such traverse is not accomplished in actual practice of the cutting operation as electrode wire 38 immediately returns to the center of the disk workpiece following segment 3. Electrode wire 38 is not electrically energized when following segment 3, but is in a "no burn" mode. Should electrode wire 38 be energized during the return to the center of the compact on segment 3, additional material from product b would be burned away, thus making product b out of specification in size. Electrode wire 38 next follows segment 4 which results in product b being cut away from the main workpiece. Next, electrode wire 38 follows path segment 5 in a no burn mode returning to the center of the workpiece. Electrode wire 38 then is electrically energized and follows segment 6 to cut away product c. Electrode wire 38 then returns to the center of the workpiece along segment 8 and traverses in the direction of segment 4 to the next adjacent workpiece. The operator need only loosen the clamp holding product d in position in the fixture to produce four 90° arc wedge shape products. It should be noted that the no burn return modes besides not burning away material from the workpieces also are accomplished at a greater rate of movement than is the rate of movement during the burn mode when a cutting action is being effected. Also, the center of each workpiece has been calibrated during the alignment procedure so that the electrode wire can be returned to the center of the workpiece after each cutting action and the location of the electrode wire is precisely known. Finally, since electrode wire EDM apparatuses inherently have a cumulative error as the electrode wire proceeds from one end of the fixture or cutting path to the opposite end of the fixture or cutting path, a minimum distance of travel of the electrode wire is desired. The illustrative cutting paths described herein minimize the distance traversed by the electrode wire for producing the desired shaped products. It is to be noted also that the cutting rate is much improved by use of the fixture of the present invention since better electrical conduction is established between the fixture and the workpieces due to the increased contact surface area.

Figure 29:
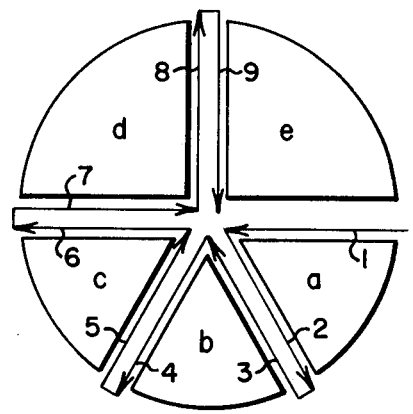
FIG. 29 shows the cutting path that the electrode wire traverses in cutting 60° arc wedge-shaped pieces.

Referring to FIG. 29, products a, b, and c each are a 60° arc wedge shape product while products e and d are 90° arc wedge shape products. Electrode wire 38 in a burn or electrically energized mode traverses from the edge of the workpiece along path segment 1 to the center of the workpiece and then to the edge of the workpiece along path segment 2 to make 60° arc wedge shape product a. Electrode wire 38 in a no burn mode then follows path 3 to the center of the workpiece followed by following path segment 4 in a burn mode to produce product b. Electrode wire 38 then follows path segment 5 in a no burn mode, path segment 6 in a burn mode to produce segment c and path segment 7 in a no burn mode to return to the center of the compact. The path shown in FIG. 29 produces 90° arc wedge shape products e and d by following burn path 8 and return, no burn, path 9 to the center of the workpiece. Again, a minimum distance of travel by electrode wire 38 is shown in FIG. 29 so that a minimum cumulative error of the electrode wire apparatus results by cutting workpieces from one end of the fixture to the other end of the fixture.

Figure 30:
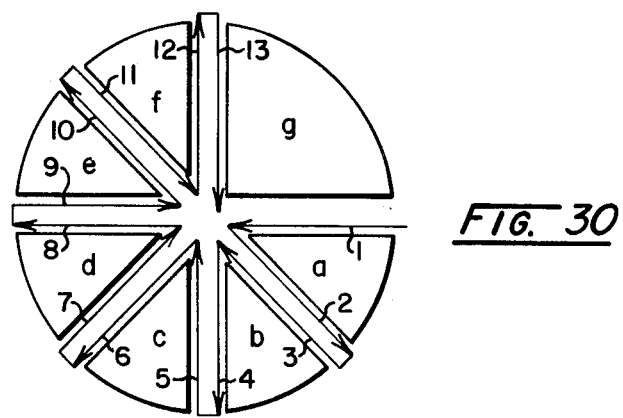
FIG. 30 shows the cutting path that the electrode wire traverses in cutting 45° arc wedge-shaped pieces.

Referring to FIG. 30, six 45° arc wedge shape products a–f are made along with 90° arc wedge shape product g which has the clamp affixed thereto. As described above, electrode wire 38 follows the path segments sequentially with a burn mode being employed along path segments 1, 2, 4, 6, 8, 10, and 12. Return, no burn, segments are 3, 5, 7, 9, 11, and 13. While 90° arc wedge shape product g can be left intact, such product segment also can be reinserted into a fixture for cutting into two equal 45° arc wedge shape products. To accomplish such recut of product g, one would employ clamp 68, locator plate 88, and base plate 76.

For cutting rectangular or other shaped products from a disk workpiece, cutting paths similar to those described in connection with FIGS. 28–30 are employed. Those skilled in this art will appreciate the design of cutting paths for accomplishing other cutting operations and the programming of the electrode wire EDM apparatus accordingly.

Materials of construction for the fixture are those conventionally used where corrosion resistance is important. With water flushing over the fixture during cutting operations, corrosion-resistant metals, eg. stainless steels, are used. The preferred metal for the fixture is AISI type 303 stainless steel (American Iron and Steel Institute).

I claim:

1. In an electrode wire EDM apparatus adapted to cut an electrode workpiece in a cutting zone, wherein said electrode wire and said workpiece are in spaced apart relationship according to a predetermined cutting path traversed by said electrode wire, said workpiece being removably mounted to a fixture which is removably secured to parallel spaced-apart work supports, the space between said work supports and adjacent said fixture defining said cutting zone, the improved fixture for said EDM apparatus which can secure a plurality of said workpieces, which comprises:
(a) a master bar which is secured to said work supports transversely therebetween and within said cutting zone;
(b) a base plate which is removably attached to the upper side of said master bar at a predetermined location thereof, said base plate having a plurality of equally-spaced support locations for said workpieces to rest upon;
(c) a locator plate which is removably attached to the upper side of said base plate at a predetermined location thereof, said locator plate having a plurality of equally-spaced recesses of predetermined configuration along an edge thereof and above said base plate support locations for a side of a workpiece to be held thereagainst; and
(d) a plurality of pre-configured clamps removably attached to the upper side of said locator plate which are tightenable to exert force against the top surfaces of said workpieces for their securing in a precise location for cutting, edgewise profiles of all components of said fixture being adapted so that each workpiece is secured and non-interfering with said predetermined cutting path.

2. The improved EDM apparatus of claim 1 wherein each said workpiece comprises a compact of polycrystalline abrasive crystals.

3. The improved EDM apparatus of claim 2 wherein each said workpiece is a polycrystalline diamond composite compact.

4. The improved EDM apparatus of claim 1 wherein the edgewise profiles of said base plate and of said locator plate are cut by said EDM apparatus.

5. A fixture for an electrode wire EDM apparatus which can secure a plurality of workpieces, each workpiece being removably mounted to said fixture wherein said electrode wire and said workpiece are in spaced-apart relationship according to a predetermined cutting path traversed by said electrode wire, which comprises:
(a) a master bar which is secured to said work supports transversely therebetween and within said cutting zone;
(b) a base plate which is removably attached to the upper side of said master bar at a predetermined location thereof, said base plate having a plurality of equally-spaced support locations for said workpieces to rest upon;
(c) a locator plate which is removably attached to the upper side of said base plate at a predetermined location thereof, said locator plate having a plurality of equally-spaced recesses of predetermined configuration along an edge thereof and above said base plate support locations for a side of a workpiece to be held thereagainst; and
(d) a plurality of pre-configured clamps removably attached to the upper side of said locator plate which are tightenable to exert force against the top surfaces of said workpieces for their securing in a precise location for cutting, the edgewise profiles of all components of said fixture being adapted so that each workpiece is secured and non-interfering with said predetermined cutting path.

6. In a method for cutting an electrically conductive workpiece by an electrode wire EDM apparatus in a cutting zone thereof, wherein said electrode wire and said workpiece are in spaced-apart relationship according to a predetermined cutting path traversed by said electrode wire, said workpiece being removably mounted to a fixture which is removably secured to parallel spaced-apart work supports, the space between said work supports and adjacent said fixture defining said cutting zone, the improvement for securing a plurality of said workpieces by said fixture and for cutting said secured workpieces which comprises removably securing each said workpiece in an improved fixture and activating said apparatus to cut each said workpiece, said improved fixture comprising
(a) a master bar which is secured to said work supports transversely therebetween and within said cutting zone;
(b) a base plate which is removably attached to the upper side of said master bar at a predetermined location thereof, said base plate having a plurality of equally-spaced support locations for said workpieces to rest upon;

(c) a locator plate which is removably attached to the upper side of said base plate at a predetermined location thereof, said locator plate having a plurality of equally-spaced recesses of predetermined configuration along an edge thereof and above said base plate support locations for a side of a workpiece to be held thereagainst; and (d) a plurality of pre-configured clamps removably attached to the upper side of said locator plate which are tightenable to exert force against the top surfaces of said workpieces for their securing in a precise location for cutting, the edgewise profiles of all components of said fixture being adapted so that each workpiece is secured and non-interfering with said predetermined cutting path.

7. The method of claim 6 wherein each said workpiece which is cut by said apparatus comprises a compact of polycrystalline abrasive crystals.

8. The method of claim 7 wherein each said workpiece cut by said apparatus is a polycrystalline diamond composite compact.

* * * * *